Figure 1:
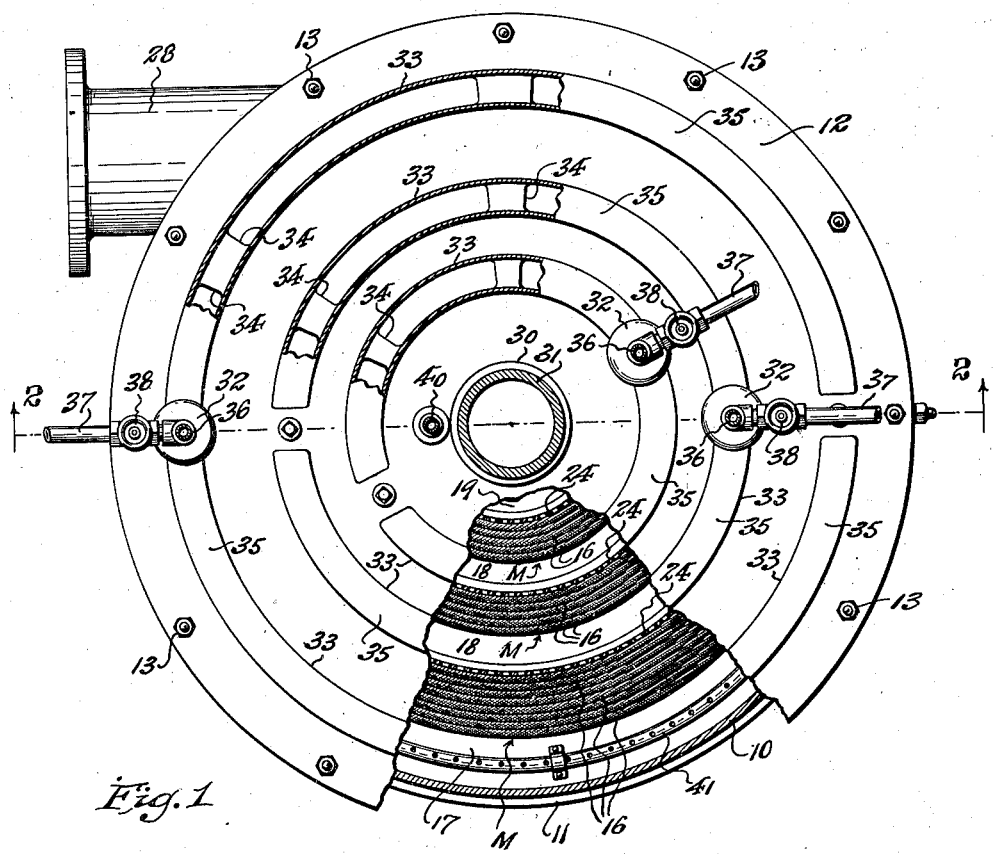

Dec. 9, 1947.  A. LAWSON ET AL  2,432,317
APPARATUS FOR SEPARATING CONSTITUENTS OF A LIQUID
MIXTURE WHICH ARE OF DIFFERENT SPECIFIC GRAVITIES
Filed July 13, 1944  2 Sheets-Sheet 1

INVENTORS:
Archibald Lawson & Charles M. Young,
BY George D. Richards,
Attorney

INVENTORS:
Archibald Lawson & Charles M. Young,
BY George D. Richards
Attorney

Patented Dec. 9, 1947

2,432,317

UNITED STATES PATENT OFFICE 2,432,317

APPARATUS FOR SEPARATING CONSTITUENTS OF A LIQUID MIXTURE WHICH ARE OF DIFFERENT SPECIFIC GRAVITIES

Archibald Lawson, East Orange, N. J., and Charles M. Young, Tampa, Fla.

Application July 13, 1944, Serial No. 544,774

5 Claims. (Cl. 210—43)

This invention relates, generally, to improvements in apparatus for separating mixed liquids of different specific gravities, and especially for separating oil from boiler feed water; and the invention has reference, more particularly, to further improvements in liquid separator apparatus of the type disclosed in our copending application for United States Letters Patent Serial No. 524,562, filed on or about March 1, 1944.

This invention has for an object to provide improved separator apparatus for the purposes stated comprising a closed housing containing a plurality of spaced, substantially perpendicular, foraminous bodies or interstitial masses through which mixed liquids of different specific gravities, such as oil bearing water, delivered into the housing, is successively passed; said foraminous bodies or interstitial masses operating to retard movement of suspended oil particles, whereby to permit accumulative agglomeration thereof into relatively large oil bodies, while at the same time exercising a capillary effect upon the accumulated oil bodies, so that the same tend to ascend through said foraminous bodies or interstitial masses and discharge therefrom to the upper portion of the housing interior, and thus by reason of the lower specific gravity of the oil relative to that of the water, to collect and form a separated liquid oil mass above the water mass, so that the lower portion of said water mass is subject to withdrawal free of oil; a novel arrangement of means being provided for collecting the accumulating separated oil subject to withdrawal free of water.

This invention has for another object to provide a liquid separator apparatus of the kind mentioned comprising a closed housing having means for admitting thereinto a mixture of liquids to be treated, and provided within the interior thereof, for extension between the bottom and top thereof with a plurality of concentrically spaced foraminous bodies or interstitial masses which are surrounded by open spaces or wells; the apparatus including oil collection means at the top and exteriorly of the housing, and oil delivery ducts leading to said collection means; said ducts respectively communicating at and substantially throughout their undersides with the respective open spaces or wells of the housing interior, and said ducts having top walls inclining upwardly throughout their lengths from the level of the housing top to a point of communication with the oil collection means, whereby to facilitate the flow of separated oil masses from the upper interior of the housing to said oil collection means; means being provided for withdrawing, at will, the separated oil from the oil collection means.

This invention has for another object to provide a novel arrangement of vent means for discharging air from both the housing interior and from the oil collection means.

Another object of the invention is to provide in relation to the upper ends of the respective foraminous bodies or interstitial masses and the open spaces or wells contiguous thereto, a series of baffles of graded height, with that of maximum height at the innermost foraminous body or interstitial mass, and diminishing in height toward the outermost foraminous body or interstitial mass; whereby, if the apparatus is tilted (to which, e. g., it would be subject as a ship installation), oil within the upper interior of the open spaces or wells will be prevented from back flow into or through the foraminous bodies or interstitial masses, and can only escape through the oil delivery ducts to the oil collection means.

Other objects of this invention, not at this time more particularly enumerated, will be understood from the following detailed description of the same.

An illustrative embodiment of this invention is shown in the accompanying drawings, in which—

Figure 2:
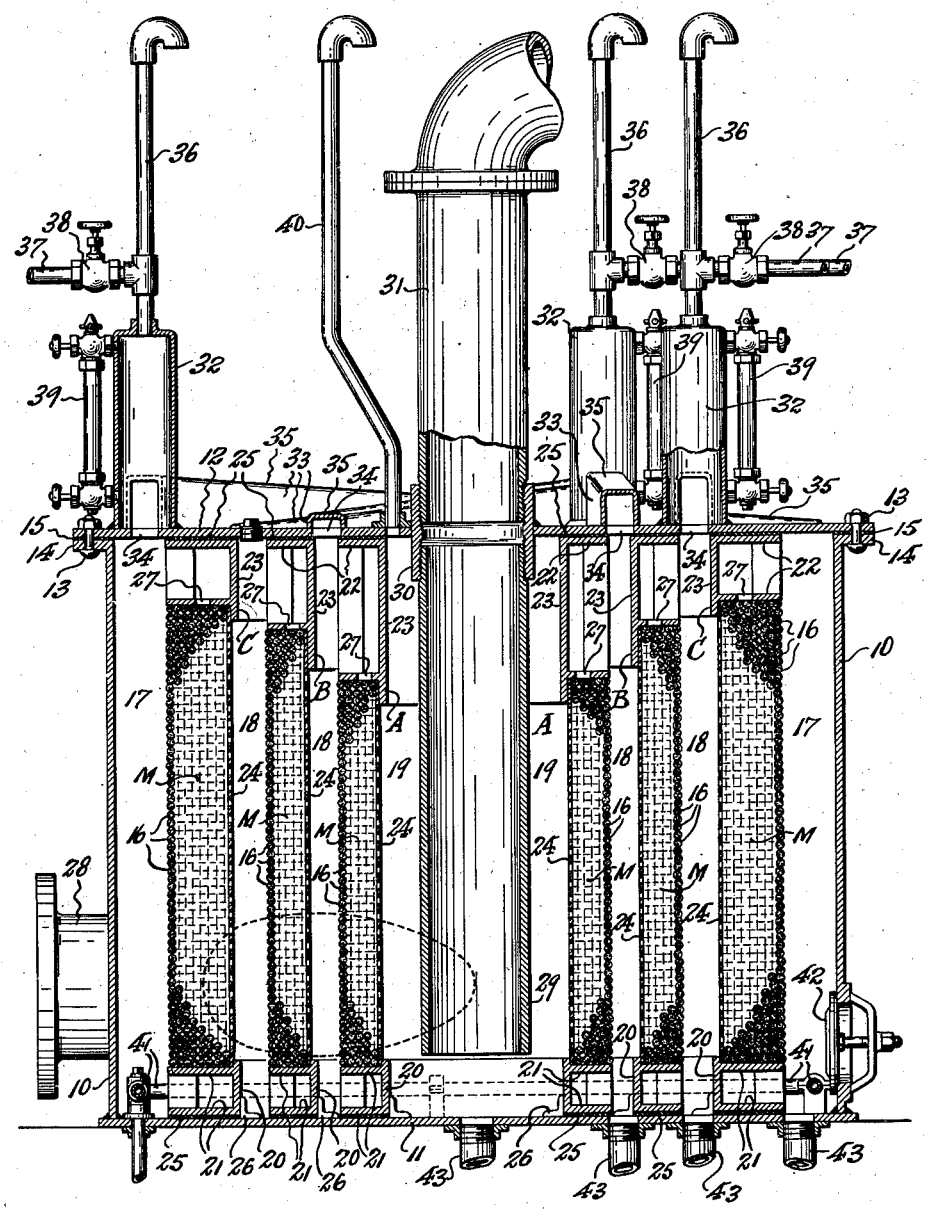

Fig. 1 is a top end view of the liquid separator apparatus according to this invention, with parts broken away to show internal construction; and Fig. 2 is a vertical longitudinal sectional view of the apparatus, taken on line 2—2 in Fig. 1.

Similar characters of reference are employed in the hereinabove described views, to indicate corresponding parts.

Referring to the drawings, the reference character 10 indicates a housing, preferably cylindrical in form, which is closed by a bottom wall 11 and by a top wall or cover member 12; the latter being preferably removably secured by bolts 13 to flange 14 with which the top end of the housing body 10 is provided. The joint between the top wall or cover member 12 and the housing body flange 14 is preferably sealed by an interposed gasket 15.

Arranged within the interior of the housing 10, to extend perpendicularly between its bottom and top ends, are annular foraminous bodies or interstitial masses to be subsequently described, the same being disposed in concentric spaced relation to each other and to the sides and axial center portion of said housing, whereby to provide an outer chamber or well 17, one or more intermediate chambers or wells 18, according to the number of spaced foraminous bodies or interstitial masses employed, and an inner or central chamber 19.

Each foraminous body or interstitial mass is supported by a spool-shaped carrier means comprising an annular bottom ring 20 having a lateral outwardly extending spool flange structure 21, an annular top ring 22 also provided with a lateral outwardly extending spool flange structure 23, and a spool body portion constituted by a hollow cylindrical perforate wall 24 secured to said bottom and top rings to extend perpendicularly between said flange structures thereof.

The flanged bottom rings 20 lie contiguous to the bottom wall 11 of the housing, while the flanged top rings 22 lie contiguous to the top wall or cover member 12 of said housing, and leak-proof joints are preferably provided between these parts by interposed gaskets 25.

Said spool-shaped carriers are held in relatively concentrically spaced relation by positioning lugs 26 which are affixed to the bottom wall 11 of the housing to abut the internal sides of the flanged bottom rings 20.

The top rings 22 of the spool-shaped carriers are of respectively different heights or perpendicular lengths, with that of the innermost carrier of maximum length, that of the outermost carrier of minimum length, and that of the intermediate carrier or carriers of intermediately graded length or lengths. By such arrangement, said top rings 22 of the spool-shaped carriers provide baffle walls, such as A, B and C of graded height, adapted, should the housing be tilted or inclined from the perpendicular, to prevent oil accumulated within the upper interior of adjacent open spaces or wells from flowing back into or through adjacent foraminous bodies or interstitial masses, or again mingling with water masses from which said oil has separated, but will be compelled to move only in outward direction through the delivery ducts to the oil collection means to be hereinafter described. The provision of such baffle arrangement is of considerable advantage when the separator is installed on shipboard or on other types of locomotive carriers. It will be understood, however, if the separator is installed upon a stable foundation or non-locomotive support so as not to be subject to tilting displacement, then such baffle arrangement may be omitted, and the several spool-shaped carriers may be of uniform construction, that is, the flanged top rings may be of the same and minimum length.

The foraminous bodies or interstitial masses may optionally comprise suitably aggregated material adapted to provide a liquid pervious porous wall mass of desired width or thickness. The material employed to provide the foraminous bodies or interstitial masses should be of such character as to be non-compacting and of such constituent form as to provide substantially uniform porosity, whereby the body or mass is not only pervious to the liquid mixture to be treated, but also adapted to exercise a capillary effect especially upon the suspended constituent of the mixture which is desired to be separated from the other constituent thereof in which it is suspended.

A material which provides the desired characteristics above referred to, is formed from a knitted mesh fabric, preferably knitted from a metallic wire strand, which may be of round, ribbon-like or of other suitable cross-sectional shape. Such knitted mesh fabric may be suitably formed into a body mass adapted to be supported by the spool-shaped carriers between the flanged top and bottom rings and around the perforate spool body portion thereof. As shown, the knitted metallic mesh fabric material is provided by a flexible cable or rope-like formation thereof of suitable cross-sectional dimensions, such as disclosed in United States Letters Patent No. 2,250,863 to A. M. Goodloe, dated July 29, 1941. Such cable or rope-like formation is indicated by the reference character 16 in the accompanying drawings, and is itself of desired foraminous, or interstitial, and therefore porous, character. By reason of its flexible cable or rope-like form, the same may be readily wound upon and around the perforate body portion 24 of each spool-shaped carrier between the flange structures 20 and 22 thereof, until a compact interstitial body mass M of desired width and thickness is obtained. The body mass M thus formed will provide a great ramification of intercommunicating interstices substantially uniformly distributed throughout the mass, whereby to both efficiently engage and accumulatively agglomerate oil particles, while at the same time exercising a capillary effect upon the oil bodies formed by aggregated oil particles, whereby to cause said oil bodies to tend to ascend through the interstitial mass, and on escape therefrom, to collect as substantially water free oil masses within the top portions of the wells or open spaces contiguous to said masses M. To further aid escape of these rising oil bodies from the interior of the masses M, flange portions of the top rings of the spool-like carriers are provided with oil emission openings 27 leading into the upper portions of said adjacent open spaces or wells.

The housing 10 is provided with a liquid mixture intake 28, which preferably enters the side thereof tangentially, and at a point adjacent to the lower interior portion of said housing. The entering mixture is thus caused to flow in a given direction around and through the outer chamber or well 17, whereby to uniformly distribute the same around the exterior of the outermost foraminous body or interstitial mass M, and so as to equalize its hydrostatic pressure and cause the same to uniformly penetrate the latter at all points, without direct impact of the entering stream being concentrated at any one point in the area of the external surface of said outermost foraminous body or interstitial mass M.

Dependent from the top wall or cover member 12 of the housing 10 and axially disposed within the inner or central chamber or well 19 thereof, is a water discharge pipe 29, the lower intake end of which is disposed at the lower level of the housing interior and in adjacently spaced relation to the bottom wall 11 of said housing. Suitable provision is made, such as the union member 30, for coupling the upper end of said water discharge pipe 29 to a water delivery conduit 31, through which water may be drawn, by pump or other suitable means, (not shown), for delivery to a place of use, such, e. g., as a boiler water storage tank or to a boiler itself to which the clean water is to serve as a feed supply.

Novel means for discharging and collecting separated oil from the upper portions of the wells or open spaces 17 and 18 is provided by the instant invention; and according thereto comprises an oil collection chamber or dome for each said well or open space, together with novel duct means for facilitating the flow of separated oil from each said well or open space to the respective collection chamber or dome provided to receive said oil therefrom. Mounted on the top wall or cover member 12 in exteriorly upstanding relation thereto and above the underlying well or open space 17 is an oil collection chamber or dome 32 of suitable cross-sectional shape and suitable height. Also mounted on the top wall or cover member 12 is oil delivery duct means leading to said collection chamber or dome 32, the same being aligned with the underlying well or open space 17, and being open at its underside so as to communicate, substantially throughout the length thereof, with said underlying well or open space 17. Preferably said duct means is formed by two branches oppositely extending from opposite sides of the collection chamber or dome 32 to a point above said well or open space 17 which is diametrically opposite that of the location of said collection chamber or dome. Each branch of said duct means comprises a channel or duct member 33 affixed to the exterior face of the top wall or cover member 12 so that the latter bounds the bottom side thereof. Beneath said channel or duct member 33, said top wall or cover member 12 is pierced by openings or slots 34, whereby the undersides of said channel or duct members are in direct communication, substantially throughout their lengths, with the upper end portions of said well or open space 17. The top walls 35 of said channel or duct members 33 incline upwardly throughout their lengths from the ends thereof remote from the collection chamber or dome 32, and from the plane of the housing top wall or cover member 12, to the points where the channel or duct members communicate with the sides of said collection chamber or dome 32. Such upwardly inclined top walls 35 of the channel or duct members 33 facilitate the flow of separated oil masses, entering the latter from the well or open space 17, toward the collection chamber or dome 32, since the upwardly inclined surfaces thereof provide a path of least resistance to the movement of such separated oil as buoyed up within the well or open space 17 by the underlying water mass from which said oil has separated.

A similar oil collection chamber and communicating duct means serves each well or open space 18 of the housing interior, and since the structure thereof is the same as above described, the parts thereof are identified in the drawings by corresponding reference characters.

Each oil collection chamber or dome 32 is provided with an oil discharge means and air vent means, comprising an air vent pipe 36 extending outwardly from the upper end portion thereof. Connected with the lower end portion of said air vent pipe 36 is an oil discharge pipe 37, including in the line thereof a suitable gate valve 38. Each oil collection chamber or dome 32 is also provided with a transparent oil sight gauge 39 adapted to visibly indicate the amount of oil accumulated within the collection chambers or domes. Normally the gate valves 38 are closed, but when the oil collection chambers or domes are filled with oil, said gate valves may be opened so as to permit the accumulated oil to be withdrawn through the oil discharge pipes 37. The air vent pipes 36 being constantly open, any air finding its way into the collection chambers or domes 32 is quickly vented by the oil rising therein.

A similar air vent pipe 40 is connected with and through the housing top wall or cover member 12, whereby to vent from the interior of the housing any air which may be carried thereinto with the entering liquid mixture.

In the operation of the apparatus, as used, e. g., to separate oil from boiler feed water, the mixture of water and oil is delivered into the interior of the housing 10 through the intake 28 so as to flow around the interior of the open space or well 17 and contiguous to the first foraminous body or interstitial mass M. The mixed liquids thereupon penetrate said first foraminous body or interstitial mass M, tending to move laterally therethrough so as to emerge from the inner side thereof and pass through the contiguous perforate wall 24 into the next well or open space 18. Upon gaining the interior of the foraminous body or interstitial mass M, the particles of oil suspended in the mixture are to a considerable extent retarded in movement by contact with the mesh material of said body or mass, and are so slowed in movement as to allow time for the oil particles to gather and coalesce, thus forming therefrom enlarged oil globules or bodies. Owing to the porous or wick-like formation of the foraminous body or interstitial mass M, the same exercises a capillary effect upon the enlarged oil bodies, whereby the same tend to work upward through the body or mass, and assisted by the buoying pressure or cross flowing water, tend to eventually escape outwardly therefrom and also through the emission opening 27 into the upper portion of the well or open space 17. Owing to the increased mass and lower specific gravity of the enlarged oil bodies thus entering the well or open space 17, said bodies tend to rise and accumulate in the upper portions of the latter and thus form a homogenous oil mass separated from the water of the underlying mixture, such accumulated oil mass thereupon entering the communicating channel or duct member 33 to flow therethrough to the oil collection chamber or dome 32 served by the latter. This process is repeated as the liquid mixture passes inwardly from one well or open space to another and through the successive foraminous bodies or interstitial masses M, until the liquid finally arriving in the innermost well or open space 19, especially within the lower part thereof, is substantially free from oil content, and consequently at this point provides a body of clean water which may be withdrawn from the interior of the apparatus through the discharge pipe 29.

After a suitably prolonged period of use it is desirable to cleanse the interior of the housing and especially the foraminous bodies or interstitial masses M thereof. This may be done by shutting off liquid mixture supply and thereupon discharging live steam under suitable pressure from a steam discharge ring 41 which is suitably disposed and supported within the bottom interior of the housing 10. Removable hand hole covers 42 may be provided in the sides of the housing 10, which, when removed, give access to the housing interior for flushing out the same. Drain pipes 43 may also be provided to lead outwardly from the bottom of the housing 10, which when opened may be utilized to drain away the flushing liquid.

Each foraminous body as carried by its spool-shaped carrier constitutes a unitary structure, which may be bodily removed from the housing interior and replaced by removing the top wall or cover member 12 of said housing.

While the apparatus has been described in connection with its use as a separator for removing oil from boiler feed water, it will be obvious that the same may be employed for separating treatment of any other kind of liquid mixtures wherein the constituents are of different specific gravities and are not solubly miscible.

We are aware that various changes could be made in the above described constructions, and that widely different embodiments of this invention could be made without departing from the scope thereof as defined by the herefollowing claims. It is therefore intended that all matter contained in the foregoing specification and shown in the accompanying drawings shall be interpreted as illustrative and not in a limiting sense.

We claim:

1. Apparatus for separating the constituents of a liquid mixture which are of different specific gravities, comprising a closed housing having liquid mixture intake means entering the side thereof adjacent to its bottom end, a series of spaced foraminous body means of substantial wall thickness extending perpendicularly within the housing interior adapted to subdivide said interior into successive perpendicular wells, the liquid mixture entering said housing being caused to pass from one well to a succeeding well through said foraminous body means, whereby to separate the constituent of lesser specific gravity from the remainder so that the former is freed to accumulate in the upper portions of certain of said wells, a series of baffle means of graded heights arranged to bound upper end portions of the respective foraminous body means and contiguous wells, the baffle means of maximum height being related to the innermost foraminous body means and that of minimum height being related to the outermost foraminous body means, a plurality of collection chamber means at the top of said housing respectively located to receive the thus separated constituent of the mixture from selected wells, duct means leading from the wells to said collection chamber means, said duct means communicating substantially throughout their undersides with said wells and having top walls inclining upwardly throughout their extent from a point at the level of the well tops to points of communication with said collection chamber means, means to discharge said collection chamber means, and means in communication with the bottom portion of the innermost well for discharging the remainder of said separated liquids.

2. Apparatus for separating the constituents of a liquid mixture which are of different specific gravities, comprising a closed housing having liquid mixture intake means entering the side thereof adjacent to its bottom end, a series of spaced foraminous body means of substantial wall thickness extending perpendicularly within the housing interior adapted to subdivide said interior into successive perpendicular wells, the liquid mixture entering said housing being caused to pass from one well to a succeeding well through said foraminous body means, whereby to separate the constituent of lesser specific gravity from the remainder so that the former is freed to accumulate in the upper portions of certain of said wells, a series of baffle means of graded heights arranged to bound upper end portions of the respective foraminous body means and contiguous wells, the baffle means of maximum height being related to the innermost foraminous body means and that of minimum height being related to the outermost foraminous body means, means to collect the thus separated constituent of the mixture from the wells subject to discharge from the apparatus, and means in communication with the bottom portion of the innermost well for discharging the remainder of said separated liquids.

3. Apparatus for separating the constituents of a liquid mixture which are of different specific gravities, comprising a closed housing having liquid mixture intake means entering the side thereof adjacent to its bottom end, a series of spaced foraminous body means of substantial wall thickness extending perpendicularly within the housing interior adapted to subdivide said interior into successive perpendicular wells, the liquid mixture entering said housing being caused to pass from one well to a succeeding well through said foraminous body means, whereby to separate the constituent of lesser specific gravity from the remainder so that the former is freed to accumulate in the upper portions of certain of said wells, a series of baffle means of graded heights arranged to bound upper end portions of the respective foraminous body means and contiguous wells, the baffle means of maximum height being related to the innermost foraminous body means and that of minimum height being related to the outermost foraminous body means, external separated constituent collection chambers mounted on the top of said housing for all wells but the innermost thereof, external duct means also connected with the top of said housing in alignment with each of said latter wells and communicating substantially throughout their undersides with said wells through openings in the housing top, said duct means having top walls inclining upwardly throughout their extent from a point at the level of the well tops to points of communication with the respective collection chambers served thereby, each collection chamber having an external transparent sight gauge connected in communication therewith, an air vent pipe leading from each collection chamber, means to discharge each collection chamber including a control valve means, and means in communication with the bottom portion of the innermost well for discharging the remainder of the separated liquids.

4. Apparatus for separating the constituents of a liquid mixture which are of different specific gravities, comprising a closed housing having liquid mixture intake means entering the side thereof adjacent to its bottom end, a series of spaced spool-shaped carriers having perforate body portions extending perpendicularly within the housing interior whereby to subdivide said interior into successive perpendicular wells, a foraminous body means supported by each carrier comprising a flexible running length of interstitial cable formed from knitted metallic mesh wound thereon, the liquid mixture entering said housing being caused to pass from one well to a succeeding well through said foraminous body means, whereby to separate the constituent of lesser specific gravity from the remainder so that the former is free to accumulate in the upper portions of certain of said wells, a series of baffle means of graded height arranged to bound upper end portions of the respective carriers and contiguous wells, the baffle means of maximum height being related to the innermost carrier and that of minimum height being related to the outermost carrier, means to collect the thus separated constituent of the mixture from the wells subject to discharge from the apparatus, and means in communication with the bottom portion of the innermost well for discharging the remainder of said separated liquids.

5. Apparatus for separating the constituents of a liquid mixture which are of different specific gravities, comprising a closed housing having liquid mixture intake means entering the side thereof adjacent to its bottom end, a series of spaced spool-shaped carriers having perforate body portions extending perpendicularly within the housing interior whereby to subdivide said interior into successive perpendicular wells, a foraminous body means supported by each carrier comprising a flexible running length of interstitial cable formed from knitted metallic mesh wound thereon, the liquid mixture entering said housing being caused to pass from one well to a succeeding well through said foraminous body means, whereby to separate the constituent of lesser specific gravity from the remainder so that the former is free to accumulate in the upper portions of certain of said wells, means to collect the thus separated constituent of the mixture from the wells subject to discharge from the apparatus, and means in communication with the bottom portion of the innermost well for discharging the remainder of said separated liquids.

ARCHIBALD LAWSON.
CHARLES M. YOUNG.

REFERENCES CITED

The following references are of record in the file of this patent:

UNITED STATES PATENTS

| Number | Name | Date |
|---|---|---|
| 408,487 | Jewell | Aug. 6, 1889 |
| 796,519 | Kneuper | Aug. 8, 1905 |
| 1,000,405 | Healy | Aug. 15, 1911 |
| 1,140,726 | Warden | May 25, 1915 |
| 1,821,082 | Tyler | Sept. 1, 1931 |
| 458,204 | Wells | Aug. 25, 1891 |
| 538,360 | Wells | Apr. 30, 1895 |
| 559,440 | Conrader | May 5, 1896 |
| 2,035,758 | Pierce | Mar. 31, 1936 |
| 2,271,662 | Rubissow | Feb. 3, 1942 |
| 2,354,931 | Tolman | Aug. 1, 1944 |
| 2,365,766 | Levier | Dec. 26, 1944 |
| 832,469 | Fleuss | Oct. 2, 1906 |
| 1,193,970 | Bacher | Aug. 8, 1916 |
| 1,616,119 | Fleeger et al. | Feb. 1, 1927 |
| 1,242,784 | Dyer et al. | Oct. 9, 1917 |
| 1,591,852 | MacArthur | July 6, 1926 |
| 1,591,853 | MacArthur | July 6, 1926 |

FOREIGN PATENTS

| Number | Country | Date |
|---|---|---|
| 964 | Sweden | Mar. 14, 1887 |
| 799,602 | France | June 16, 1936 |